(12) United States Patent
Sun

(10) Patent No.: US 11,938,994 B2
(45) Date of Patent: Mar. 26, 2024

(54) STROLLER AND REVERSIBLE MECHANISM THEREOF

(71) Applicant: Wonderland Switzerland AG, Steinhausen (CH)

(72) Inventor: Mingxing Sun, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 402 days.

(21) Appl. No.: 17/016,347

(22) Filed: Sep. 9, 2020

(65) Prior Publication Data

US 2021/0070345 A1 Mar. 11, 2021

(30) Foreign Application Priority Data

Sep. 11, 2019 (CN) .......................... 201910862582.7

(51) Int. Cl.
  *B62B 9/12* (2006.01)
  *B62B 9/20* (2006.01)
(52) U.S. Cl.
  CPC ................. *B62B 9/12* (2013.01); *B62B 9/20* (2013.01); *B62B 9/203* (2013.01)
(58) Field of Classification Search
  CPC ....... B62B 9/203; B62B 7/08; B62B 2205/22; B62B 2205/20
  See application file for complete search history.

(56) References Cited

U.S. PATENT DOCUMENTS

| 4,733,882 | A | | 3/1988 | Kassai | |
|---|---|---|---|---|---|
| 4,906,017 | A | * | 3/1990 | Kassai | ...................... B62B 7/08 280/658 |
| 5,056,805 | A | * | 10/1991 | Wang | ...................... F16C 11/10 280/658 |
| 5,845,924 | A | | 12/1998 | Huang | |
| 6,116,624 | A | | 9/2000 | Hu | |
| 6,508,605 | B1 | * | 1/2003 | Cheng | ...................... B62B 9/203 280/643 |

(Continued)

FOREIGN PATENT DOCUMENTS

| CN | 105329304 A | 2/2016 |
|---|---|---|
| CN | 207311563 U | 5/2018 |

(Continued)

*Primary Examiner* — Emma K Frick
(74) *Attorney, Agent, or Firm* — Winston Hsu

(57) ABSTRACT

A stroller includes a stroller frame, a reversible member pivoted to the stroller frame, and a reversible mechanism. The reversible mechanism locks the reversible member at different positions and includes a sliding sleeve, a release actuator movably disposed on the reversible member and linked with the sliding sleeve, and anchoring portions disposed on at least two different positions. The sliding sleeve movably jackets the reversible member and is selectively engaged with any anchoring portion. The sliding sleeve moves together with the release actuator or is directly operated for releasing the anchoring portion, so as to make the reversible member rotatable to another position. Since the release actuator is linked with the sliding sleeve, the release actuator can be disposed at a position easy to operate, so that the handle reversing operation can be performed conveniently and quickly. Furthermore, the reversible mechanism has a simple structural design.

16 Claims, 9 Drawing Sheets

(56) References Cited

U.S. PATENT DOCUMENTS

| | | | |
|---|---|---|---|
| 8,210,563 B2* | 7/2012 | Dotsey | B62B 9/20 |
| | | | 280/647 |
| 8,485,547 B2* | 7/2013 | Hsu | B62B 7/062 |
| | | | 280/658 |
| 9,701,332 B2 | 7/2017 | Zheng | |
| 10,106,185 B2* | 10/2018 | Plested | B62B 7/068 |
| 2012/0326418 A1 | 12/2012 | Ohnishi | |

FOREIGN PATENT DOCUMENTS

| | | | | |
|---|---|---|---|---|
| CN | 207889797 U | | 9/2018 | |
| EP | 0 257 588 A2 | | 3/1988 | |
| EP | 0 257 588 A3 | | 2/1989 | |
| GB | 2519670 A | * | 4/2015 | B62B 7/06 |
| JP | 60-139671 U | | 9/1985 | |
| JP | 1-57961 U | | 4/1989 | |
| JP | 3-84272 U | | 8/1991 | |
| JP | 2000-159121 A | | 6/2000 | |
| JP | 2013-6553 A | | 1/2013 | |
| JP | 7250886 B2 | * | 4/2023 | |

\* cited by examiner

STROLLER AND REVERSIBLE MECHANISM THEREOF

BACKGROUND OF THE INVENTION

1. Field of the Invention

The present invention relates to a stroller and a reversible mechanism thereof, and more specifically, to a stroller having a reversible mechanism for performing the handle reversing operation of the stroller conveniently and quickly and a reversible mechanism thereof.

2. Description of the Prior Art

Rapid developed economics and technology provide people with various consumer products, such as an infant carrier (e.g. a stroller or an infant bassinet). The stroller not only allows an adult to operate it with one hand to reduce his burden when taking an infant out, but also makes the infant sit thereon comfortably. Thus, the stroller has become more and more popular in infant caring. With improvement of user demand for the stroller, the stroller design has been made progress for satisfying the user needs.

Recently, a reversible stroller has become popular in infant caring due to the following advantages: 1. the reversible stroller can be transferred from a forward facing position to a rearward facing position for protecting the infant sitting thereon from strong light or strong wind; 2. the infant can see the caregiver's face to reduce his insecurity when the caregiver pushes the reversible stroller; 3. the reversible function can expand the infant's view.

The reversible stroller is mainly divided into two types: one is the handle reversible type; the other is the seat reversible type. A stroller having a reversible handle is more popular with people since it is more convenient to operate than a stroller having a reversible seat. In general, a conventional stroller having a reversible handle allows that a user can operate a sliding sleeve disposed at a bottom end of the handle to release the handle and then rotate an upper end of the handle to perform a handle reversing operation. However, the aforesaid handle reversing process takes a long time to release and then reverse the handle, so as to make the user unable to complete the handle reversing operation quickly.

Thus, it is necessary to design a stroller and a reversible mechanism thereof to make the reversing operation of the stroller quick and convenient for solving the aforesaid problems.

SUMMARY OF THE INVENTION

One purpose of the present invention is to provide a reversible mechanism for performing the handle reversing operation of a stroller conveniently and quickly.

Another purpose of the present invention is to provide a stroller having a reversible mechanism for performing the handle reversing operation of the stroller conveniently and quickly.

For achieving the aforesaid purposes, a reversible mechanism of the present invention is disposed on a stroller. The stroller includes a stroller frame and a reversible member pivoted to the stroller frame. The reversible mechanism locks the reversible member at different positions relative to the stroller frame and includes anchoring portions, a sliding sleeve, and a release handle. The anchoring portions are disposed on at least two different positions of the stroller frame. The sliding sleeve movably jackets the reversible member. The sliding sleeve is selectively engaged with any one of the anchoring portions for locking the reversible member at the different positions relative to the stroller frame. The release actuator is movably disposed on the reversible member and linked with the sliding sleeve. The sliding sleeve is switched between a locking position and a releasing position with movement of the release actuator or is directly operated for locking or releasing the anchoring portion.

Preferably, the reversible mechanism further includes a linking member disposed in the reversible member, a first end of the linking member is connected to the release actuator, and a second end of the linking member is connected to the sliding sleeve.

Preferably, the reversible mechanism further includes a driving member movably disposed in the reversible member and linked with the sliding sleeve, the second end of the linking member is connected to the driving member. When the release actuator is operated, the release actuator moves the driving member via the linking member for driving the sliding sleeve to lock or release the anchoring portion.

Preferably, the release actuator is protrusively disposed on the reversible member and is slidable along a lengthwise direction of the reversible member, the driving member is slidably disposed in the reversible member, and the sliding sleeve is slidably disposed on the reversible member along the lengthwise direction of the reversible member.

Preferably, the reversible mechanism further includes a fixing pin, and the fixing pin is fixedly connected to the first end of the linking member and the release actuator.

Preferably, a first guide slot is formed along the lengthwise direction of the reversible member, and the fixing pin is slidably disposed through the first guide slot.

Preferably, the reversible mechanism further includes an elastic member disposed in the reversible member, the elastic member is disposed between the reversible member and the driving member, and the elastic member biases the driving member to keep driving the sliding sleeve to be engaged with the anchoring portion.

Preferably, the elastic member is in a compressed state and is disposed between the reversible member and the driving member.

Preferably, the linking member is disposed through the elastic member.

Preferably, the driving member is fixedly connected to the sliding sleeve.

Preferably, the driving member is fixedly connected to the sliding sleeve via a pin passing therethrough.

Preferably, a second guide slot is formed on the reversible member for guiding and limiting movement of the pin, and the pin is slidably disposed through the second guide slot.

Preferably, one of the sliding sleeve and the anchoring portion has a protrusion, the other of the sliding sleeve and the anchoring portion has a recessed structure, the protrusion slides into the recessed structure to lock the sliding sleeve on the anchoring portion, and the protrusion is disengaged from the recessed structure to release the sliding sleeve from the anchoring portion.

Preferably, the recessed structure is an arc-shaped groove, and the protrusion has a convex curved surface mating with the arc-shaped groove.

Preferably, the linking member is rigid link or a flexible steel wire.

For achieving the aforesaid purposes, a stroller of the present invention includes a stroller frame, a reversible member, and the aforesaid reversible mechanism. The reversible mechanism locks the reversible member at different positions relative to the stroller frame.

Preferably, the stroller further includes a pivot shaft disposed on the reversible member or the stroller frame, and the reversible member is pivotally connected to the stroller frame via the pivot shaft.

Preferably, the reversible member is a handle.

Preferably, an avoiding hole is formed on the reversible member and has an opening.

Preferably, a containing cavity is formed on the reversible member, and the driving member and the linking member are slidably disposed in the containing cavity.

Compared with the prior art, the stroller of the present invention includes the stroller frame, the reversible member pivoted to the stroller frame, and the reversible mechanism. The reversible member can be locked at different positions on the stroller frame via the reversible mechanism, so as to achieve the purpose that the handle reversing operation of the stroller can be performed quickly and conveniently. Via the aforesaid design that the sliding sleeve can be engaged with or disengaged from the anchoring portion, the release actuator is linked with the sliding sleeve, the release actuator and the sliding sleeve are movably disposed on the reversible member, and the anchoring portions are disposed on at least two different positions of the stroller frame, the sliding sleeve can be engaged with any one of the anchoring portions for locking the reversible member at the different positions on the stroller frame. In such a manner, after the user operates the release actuator, movement of the release actuator can drive the sliding sleeve to be disengaged from the anchoring portion, so as to make the reversible member rotatable relative to the stroller frame. Subsequently, the reversible member can be locked at a reversing position on the stroller frame after rotating the reversible member to the reversing position. In summary, since the release actuator is linked with the sliding sleeve, the release actuator can be disposed at a position easy to operate, so as to achieve the purpose that the handle reversing operation of the stroller can be performed conveniently and quickly. Furthermore, as known from the aforesaid description, the reversible mechanism of the present invention has a simple structural design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
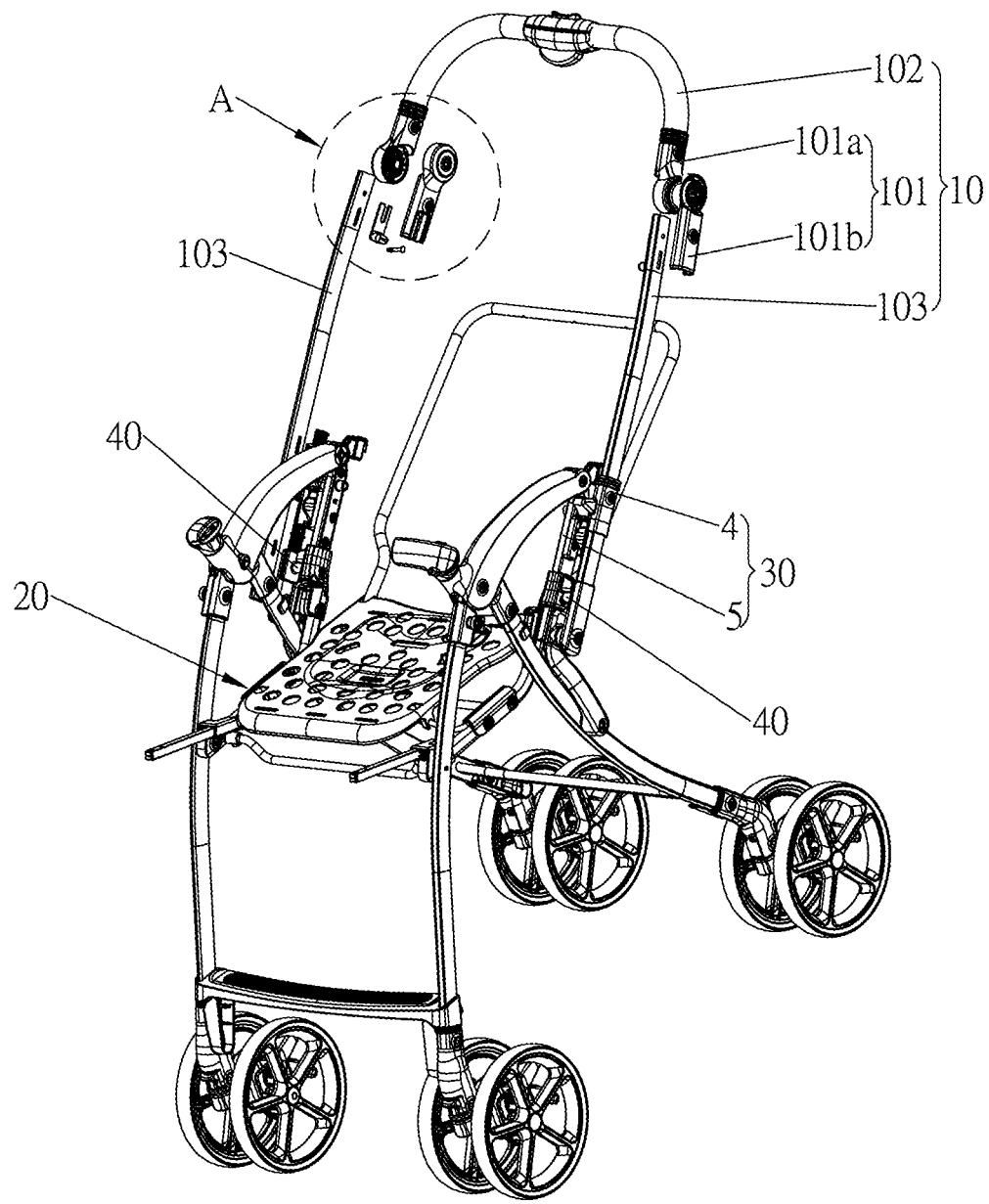
FIG. 1 is a partial exploded diagram of a stroller according to a preferred embodiment of the present invention.
Figure 2:
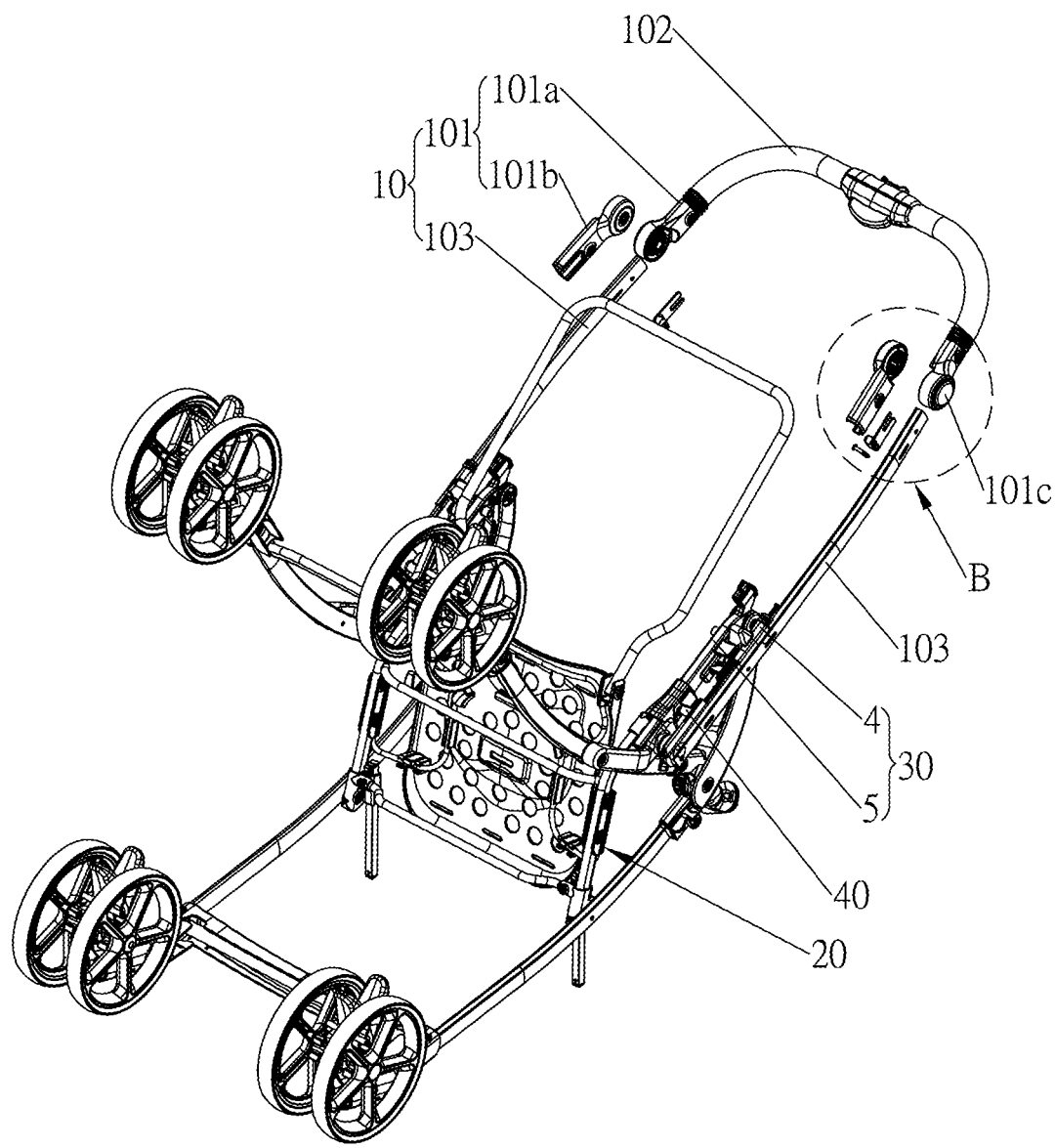
FIG. 2 is a partial exploded diagram of the stroller in FIG. 1 from another viewing angle.
Figure 3:
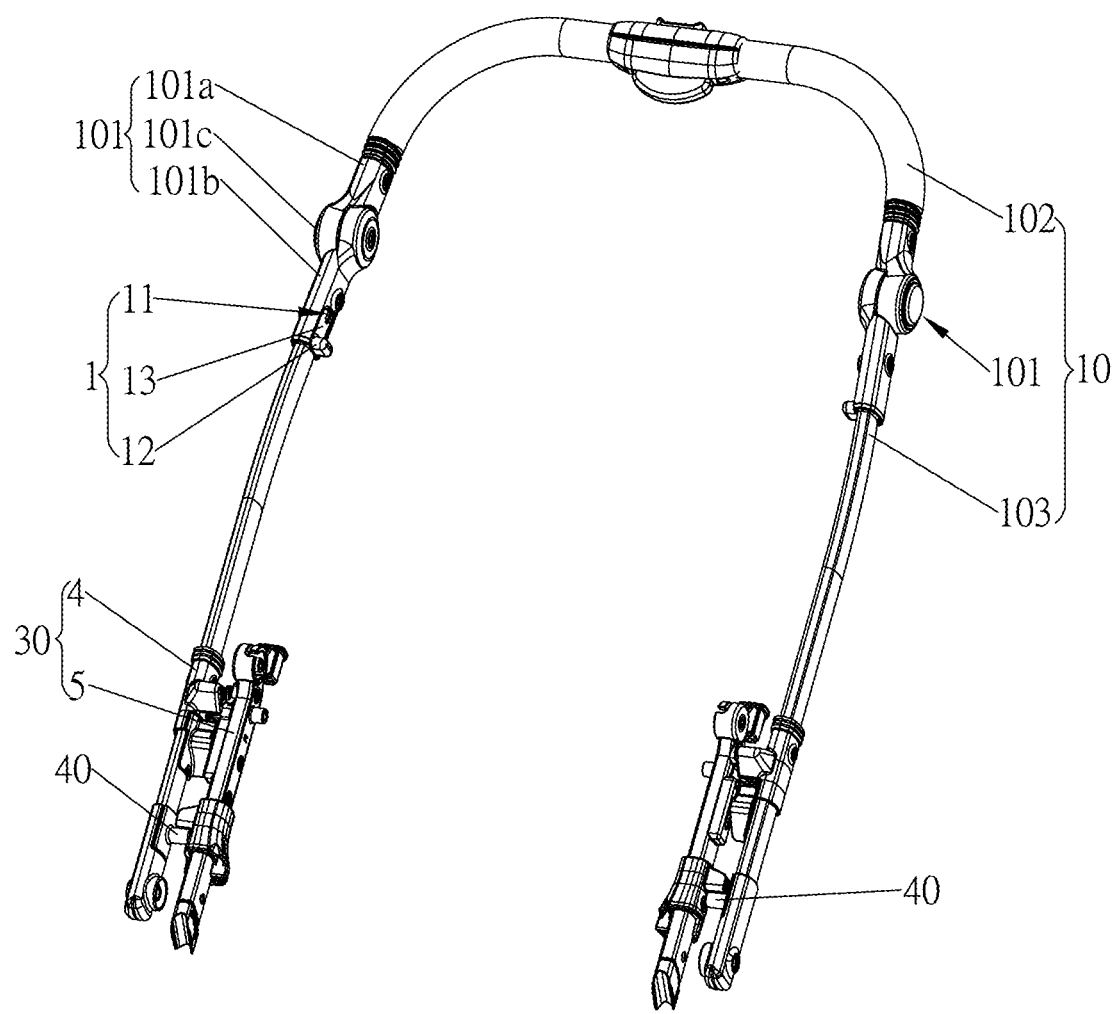
FIG. 3 is a diagram of the stroller in FIG. 1 after a stroller frame is hidden.
Figure 4:
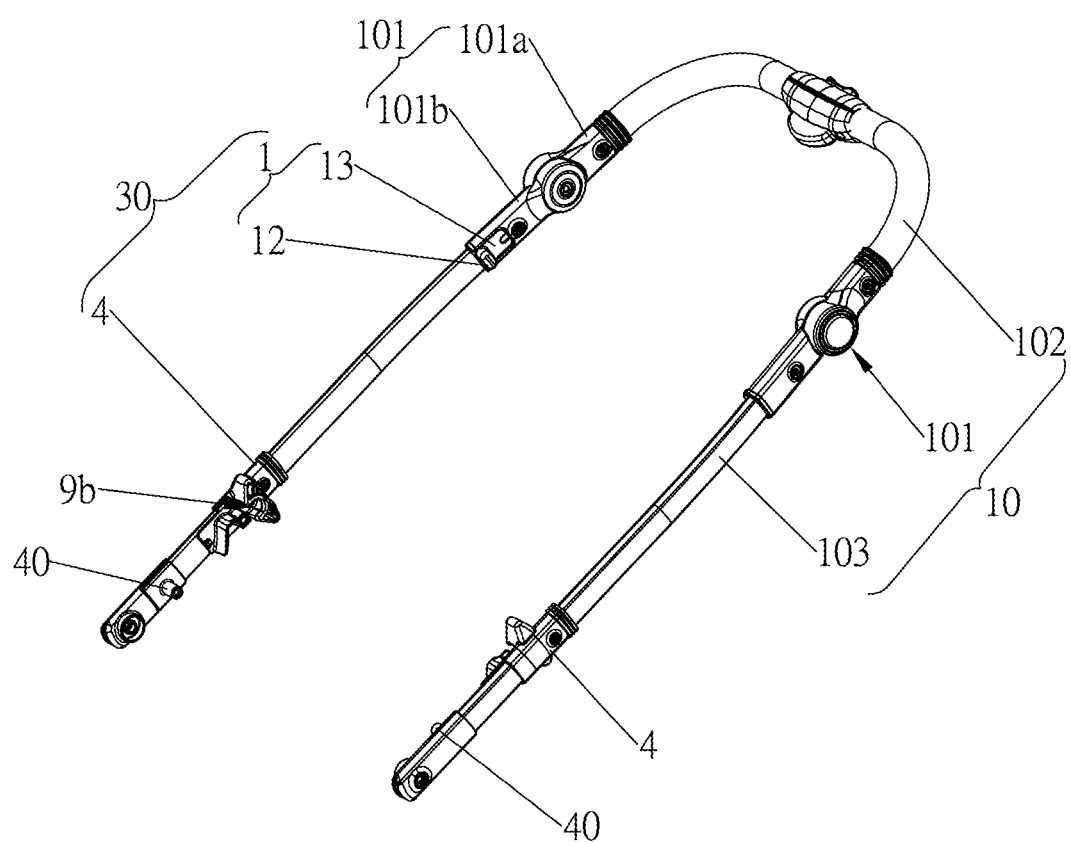
FIG. 4 is an assembly diagram of a handle and a reversible mechanism of the stroller in FIG. 1.

The detailed description for preferred embodiments of the present invention is provided with attached drawings as follows.

A stroller of the present invention includes a stroller frame, a reversible member, and a reversible mechanism. The reversible member can be locked at different positions relative to the stroller frame. The reversible mechanism includes anchoring portions, a release actuator, and a sliding sleeve. The anchoring portions are disposed on at least two different positions of the stroller frame. The sliding sleeve movably jackets the reversible member. The sliding sleeve is selectively engaged with any one of the anchoring portions for locking the reversible member at the different positions relative to the stroller frame. The release actuator is movably disposed on the reversible member and linked with the sliding sleeve. The sliding sleeve is switched between a locking position and a releasing position with movement of the release actuator or is directly operated for locking or releasing the anchoring portion.

It should be mentioned that the present invention is not limited to the following description for the preferred embodiments of the present invention. That is, all the designs in which the reversible mechanism includes the reversible member, the sliding sleeve and the anchoring portion and the stroller has the reversible mechanism disposed thereon may fall within the scope of the present invention, and the present invention is not limited to the following embodiments.

Please refer to FIGS. 1-4. A stroller 100 of the present invention includes a stroller frame 20, a reversible member pivoted to the stroller frame 20, and a reversible mechanism 30. The reversible member can be locked at different positions relative to the stroller frame 20. In this embodiment, the reversible member is a handle 10. Specifically, in this embodiment, the stroller 100 of the present invention further includes a pivot shaft 40. The pivot shaft 40 is disposed on the handle 10 to pivotally connect the handle 10 to the stroller frame 20, but not limited thereto. That is, in another embodiment, the pivot shaft 40 could be disposed on the stroller frame 20, or the pivot shaft 40 could be disposed through the handle 10 and the stroller frame 20, which can also achieve the purpose that the handle 10 is pivotable relative to the stroller frame 20.

Please refer to FIGS. 1-4 and FIGS. 8-9. The handle 10 includes a joint structure 101, a U-shaped tube 102 connected to a first end of the joint structure 101, and a straight tube 103 connected to a second end of the joint structure 101. Specifically, the straight tube 103 is pivoted to the stroller frame 20. To be more specific, a lower end of the straight tube 103 is pivoted to the stroller frame 20. The joint structure 101 includes an upper joint 101*a* and a lower joint 101*b*. The upper joint 101*a* is pivoted to the lower joint 101*b*. A fine-adjusting button 101*c* is disposed at a position where the upper joint 101*a* is pivoted to the lower joint 101*b*. The fine-adjusting button 101*c* is operable to make the upper joint 101*a* slightly rotatable relative to the lower joint 101*b*. To be more specific, in this embodiment, the U-shaped tube 102 is inserted into the upper joint 101*a*, and the straight tube 103 is inserted into the lower joint 101*b*. In such a manner, slight adjustment for the U-shaped tube 102 and the straight tube 103 can be performed via the fine-adjusting button 101*c*. That is, after a user presses the fine-adjusting button 101*c*, the U-shaped tube 102 can be operated to slightly rotate relative to the straight tube 103 for improving operational comfort of the stroller 100. To be more specific, in this embodiment, the upper joint 101*a* has an external gear 1011, and the lower joint 101*b* has an internal gear 1012. The internal gear 1012 is engaged with the external gear 1011 to make the upper joint 101*a* pivoted to the lower joint 101*b*. In another embodiment, the internal gear 1012 could be disposed on the upper joint 101a, and could be engaged with the external gear 1011 disposed on the lower joint 101b for pivotally connecting the upper joint 101a to the lower joint 101b. For example, a containing cavity 103a is formed on the handle 10. To be more specific, the containing cavity 103a is formed on the straight tube 103 for containing some components in the reversible mechanism 30, so as to achieve the space saving effect and make the stroller 100 have a compact appearance.

Please refer to FIGS. 3-6 and FIGS. 8-9. The reversible mechanism 30 includes a release actuator 1, a driving member 2, a linking member 3, a sliding sleeve 4, anchoring portions 5, and an elastic member 6. The release actuator 1 is movably disposed on the handle 10. Specifically, the release actuator 1 is disposed at an upper end of the straight tube 103, so that operating the release actuator 1 and rotating the handle 10 can be performed synchronously for completing the reversing operation of the stroller 100 conveniently and quickly. The driving member 2 is movably disposed in the handle 10, and the linking member 3 is disposed in the handle 10. Specifically, the driving member 2 is movably disposed in the containing cavity 103a, and the linking member 3 is disposed in the containing cavity 103a. A first end of the linking member 3 is connected to the release actuator 1, and a second end of the linking member 3 is connected to the driving member 2. The sliding sleeve 4 movably jackets the handle 10 and is linked with the driving member 2. Specifically, the sliding sleeve 4 movably jackets the lower end of the straight tube 103. The anchoring portions 5 are disposed at two different positions on the stroller frame 20 respectively. The sliding sleeve 4 can be selectively engaged with any one of the anchoring portions 5 for locking the handle 10 at different positions on the stroller frame 20, but not limited thereto. That is, the present invention could adopt the design that the anchoring portions 5 are disposed at three or four different positions on the stroller frame 20 respectively in another embodiment, so as to achieve the purpose that the handle 10 can be switched to plural reversible positions relative to the stroller frame 20 for providing a multi-stage reversible function. The elastic member 6 is located in the containing cavity 103a and disposed between a wall 103b of the containing cavity 103a and the driving member 2. The elastic member 6 biases the driving member 2 to keep driving the sliding sleeve 4 to be engaged with the anchoring portion 5.

The sliding sleeve 4 can be driven by operating the release actuator 1 to move the driving member 2 via the linking member 3, or can be directly operated for locking or releasing the anchoring portion 5. In such a manner, the stroller 100 of the present invention allows that the user can selectively operate the release actuator 1 or the sliding sleeve 4 to disengage the sliding sleeve 4 from the anchoring portion 5 for making the handle 10 rotatable relative to the stroller frame 20, so as to improve operational flexibility of the stroller 100. To be noted, the aforesaid way of operating the release actuator 1 allows that the user can operate the handle 10 (e.g. the user can hold the straight tube 103) quickly after releasing the anchoring portion 5, so as to reduce time for performing the aforesaid release and reversible operations and to complete the handle reversing operation conveniently and quickly. The release actuator 1, the driving member 2 and the sliding sleeve 4 are slidably disposed on the handle 10. Specifically, the driving member 2 and the linking member 3 are slidably disposed in the containing cavity 103a. As such, the release actuator 1 can slide relative to the handle 10 for driving the linking member 3 to slide relative to the handle 10, and sliding of the linking member 3 can drive the driving member 2 for locking or releasing the sliding sleeve 4 and the anchoring portion 5. Specifically, the linking member 3 is a flexible steel wire in this embodiment, but not limited thereto, meaning that the linking member 3 could be a rigid link in another embodiment. In summary, the reversible mechanism 30 can utilize the linking member 3 to achieve long distance linkage between the release actuator 1 and the driving member 2 for locking or releasing the sliding sleeve 4 and the anchoring portion 5, such that the release actuator 1 can be disposed at a position easy to operate (e.g. an upper end or a top end of the handle 10) for performing the handle reversing operation of the stroller 100 conveniently and quickly.

Please refer to FIGS. 3-6 and FIGS. 8-9. The reversible mechanism 30 further includes a fixing pin 7. The fixing pin 7 is fixedly connected to the first end of the linking member 3 and the release actuator 1 (but not limited thereto, meaning that the present invention could adopt the design that the fixing pin 7 is detachably connected to the release actuator 1 in another embodiment). The straight tube 103 has a first guide slot 1031 formed along a lengthwise direction of the straight tube 103 for guiding and limiting movement of the fixing pin 7. The fixing pin 7 is slidably disposed through the first guide slot 1031. An avoiding hole 11 is formed on the release actuator 1 and has an opening 111. As such, when the release actuator 1 slides, the avoiding hole 11 and the opening 111 can prevent the release actuator 1 from colliding with fixing components (not shown in the figures of the present invention) located between the lower joint 101b and the straight tube 103, so as to make the release actuator 1 slide smoothly and also make the structural design of the handle 10 reasonable. Furthermore, the avoiding hole 11 is a long hole for guiding and limiting movement of the release actuator 1. When the user operates the release actuator 1, the release actuator 1 can drive the fixing pin 7 to slide along the first guide slot 1031. Accordingly, the linking member 3 can be driven by the fixing pin 7 to slide in the containing cavity 103a, so as to drive the driving member 2 connected to the second end of the linking member 3 to slide relative to the handle 10 for disengaging the sliding sleeve 4 from the anchoring portion 5.

Figure 5:
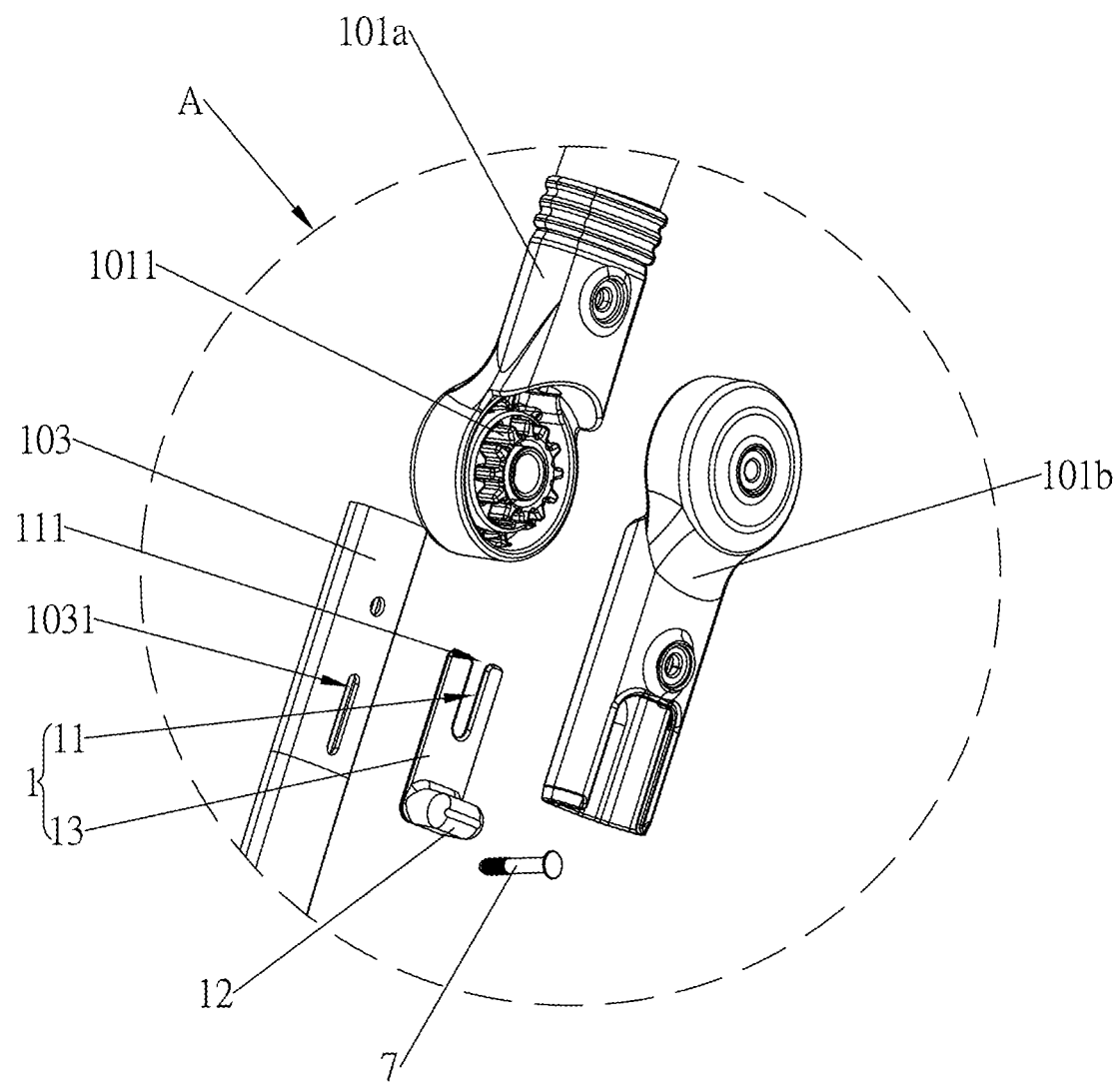
FIG. 5 is an enlarged diagram of "A" region in FIG. 1.
Figure 6:
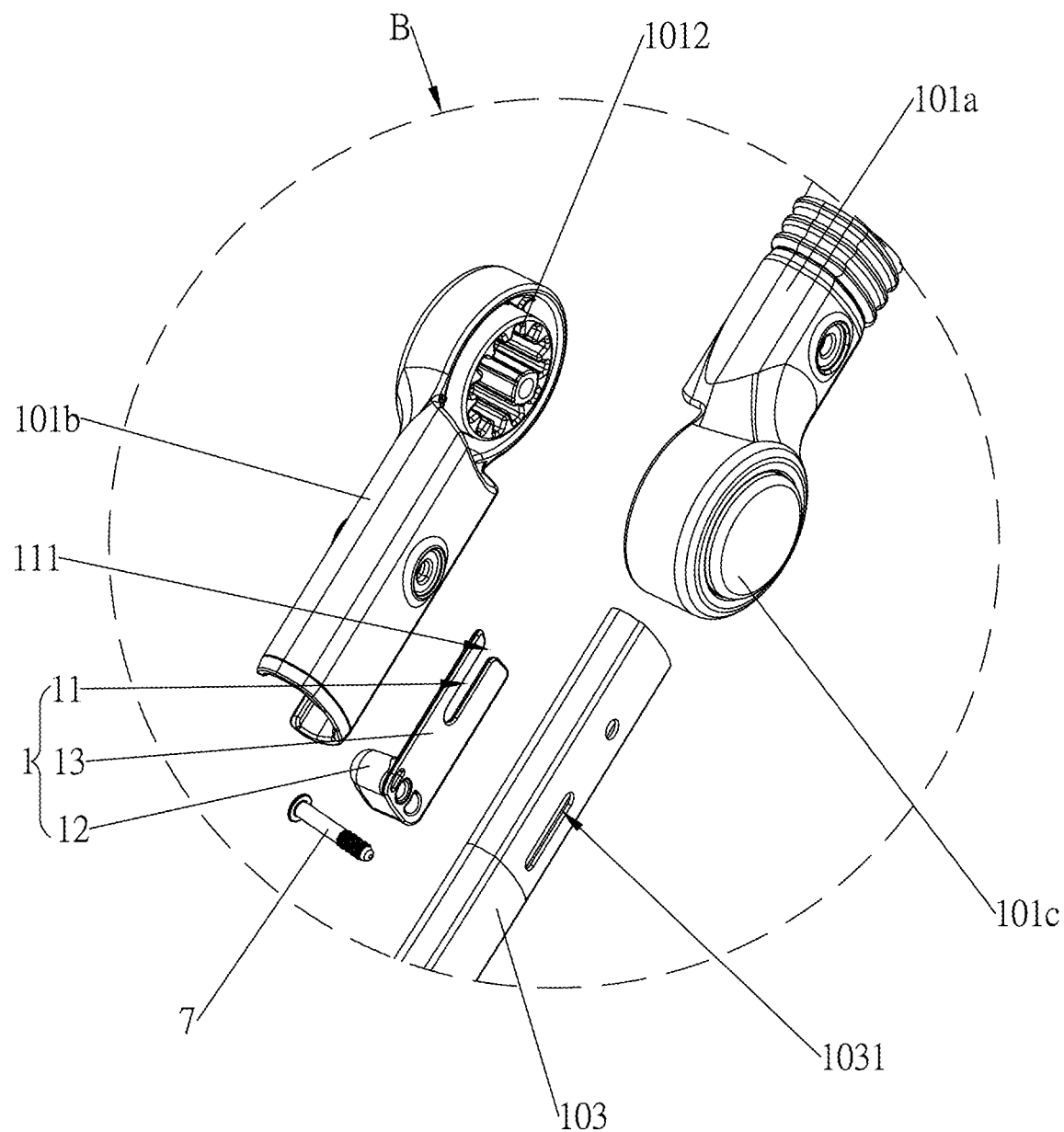
FIG. 6 is an enlarged diagram of "B" region in FIG. 2.

Please refer to FIGS. 5-6. The release actuator 1 includes an operating portion 12 and a sliding board 13. An end of the sliding board 13 is formed integrally with the operating portion 12. The operating portion 12 protrudes from the sliding board 13, so that the user can pull the operating portion 12 conveniently. Specifically, the avoiding hole 11 is formed on the sliding board 13. To be more specific, the release actuator 1 is slidably disposed between the straight tube 103 and the lower joint 101b. During the installation process, the straight tube 103 is inserted into the lower joint 101b after the release actuator 1 is positioned on the straight tube 103 together with the fixing pin 7.

Figure 7:
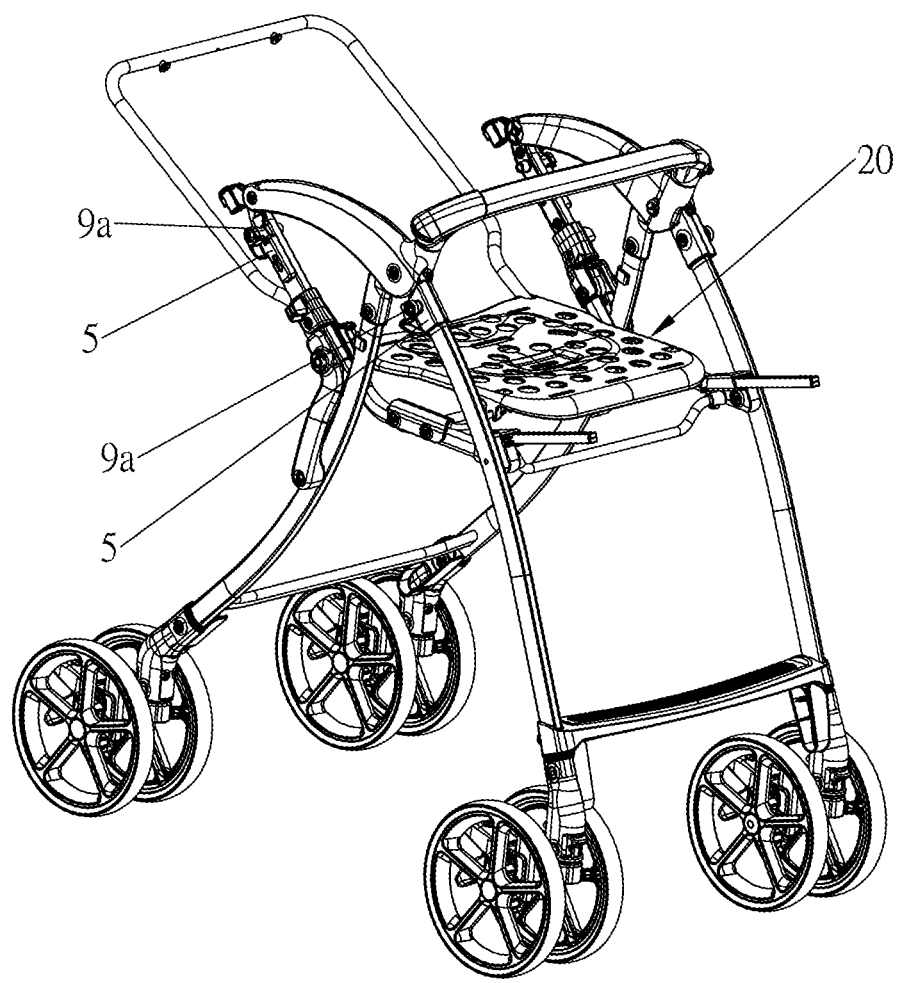
FIG. 7 is a diagram of the stroller in FIG. 1 after the handle and part of the reversible mechanism are hidden.
Figure 8:
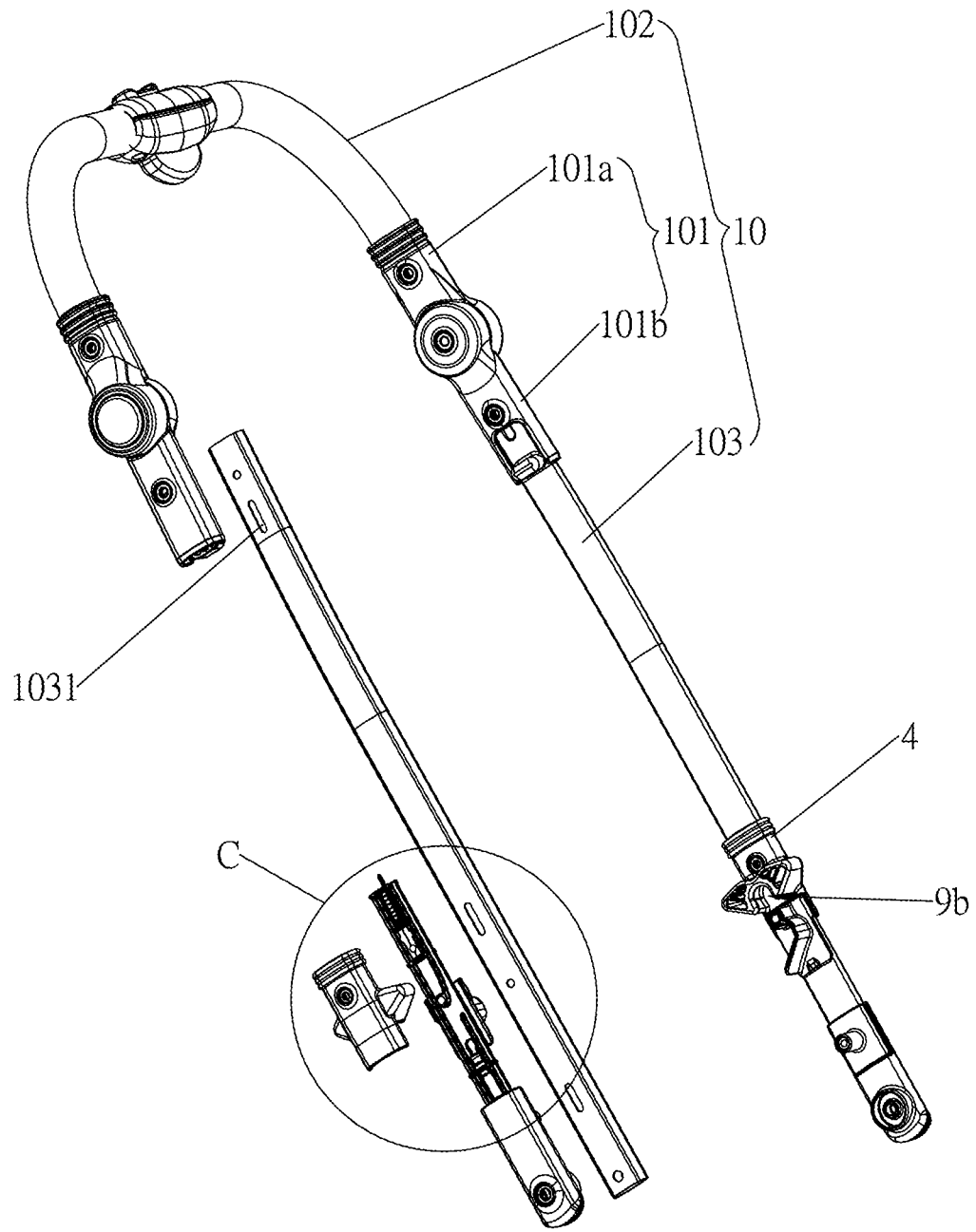
FIG. 8 is a partial exploded diagram of the reversible mechanism and the handle in FIG. 4.
Figure 9:
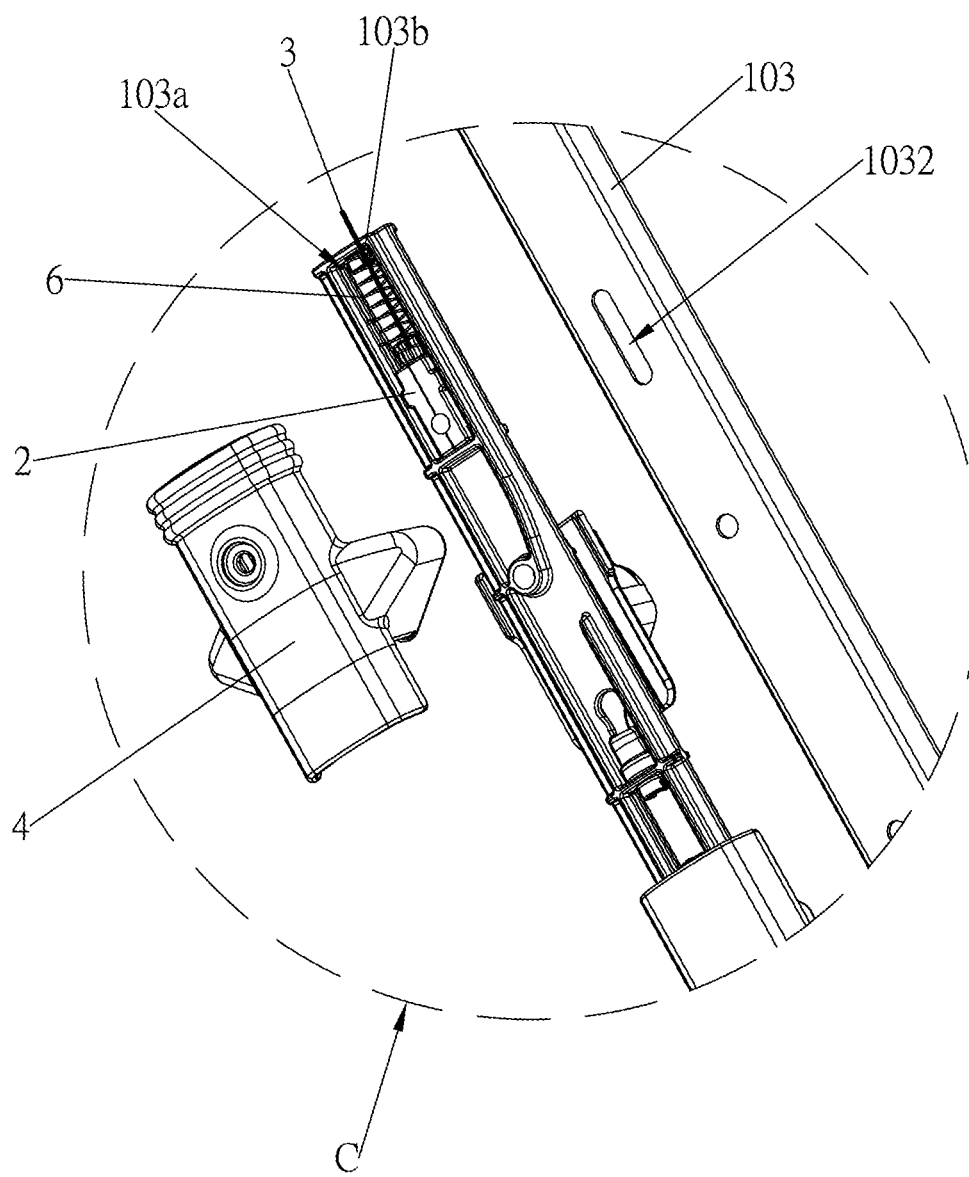
FIG. 9 is an enlarged diagram of "C" region in FIG. 8.

Please refer to FIGS. 7-9, the elastic member 6 is disposed between the straight tube 103 and the driving member 2 and is in a compressed state. Specifically, an end of the elastic member 6 abuts against a wall 103b of the containing cavity 103a, and the other end of the elastic member 6 abuts against the driving member 2 (but not limited thereto, meaning that the present invention could adopt the design that the other end of the elastic member 6 is fixedly connected to the driving member 2 in another embodiment). Specifically, in this embodiment, the elastic member 6 is a coil spring, and the linking member 3 passes through the coil spring to be connected to the driving member 2 (but not limited thereto, meaning that the present invention could adopt the design that the linking member 3 is a rigid link and the rigid link passes through the coil spring to be connected to the driving member 2 in another embodiment). As such, when the release actuator 1 is released, elastic force of the elastic member 6 can drive the driving member 2 to slide relative to the handle 10, so as to return the release actuator 1 to its original position via the linking member 3. At the same time, sliding of the driving member 2 can further make the sliding sleeve 4 engaged with the anchoring portion 5. Thus, the reversible mechanism 30 can utilize the elastic member 6 to achieve the automatic returning purpose, but not limited thereto. That is, in another embodiment, the present invention could adopt the design that one of two magnetic structures magnetically repulsive to each other is fixed to the wall 103*b* of the containing cavity 103*a* and the other is fixed to the driving member 2 for achieving the automatic returning purpose via magnetic repulsive force between the two magnetic structures.

Please refer to FIGS. 1-4. The driving member 2 is fixedly connected to the sliding sleeve 4, and the driving member 2 slides to disengage the sliding sleeve 4 from the anchoring portion 5. A pin (not shown in the figures of the present invention) passes through the driving member 2 and the sliding sleeve 4 to fix the driving member 2 to the sliding sleeve 4. Specifically, a second guide slot 1032 is formed on the handle 10 for guiding and limiting movement of the pin. The pin is slidably disposed through the second guide slot 1032 for preventing the driving member 2 and the sliding sleeve 4 from sliding out of a predetermined range relative to the handle 10. It could be understood that the sliding sleeve 4 could be movably disposed on the driving member 2 and sliding of the driving member 2 drives the sliding sleeve 4 to be disengaged from the anchoring portion 5 in another embodiment. For example, a slanted slot is formed on the driving member 2, and the sliding sleeve 4 has a pillar slidably disposed through the slanted slot. As such, when the driving member 2 slides, the slanted slot pushes the pillar to slide for achieving the purpose that the sliding sleeve 4 can move together with the driving member 2 for disengaging the sliding sleeve 4 from the anchoring portion 5.

Please refer to FIGS. 7-9. The anchoring portion 5 has a protrusion 9*a*, and the sliding sleeve 4 has a recessed structure 9*b*. The protrusion 9*a* slides into the recessed structure 9*b* for locking the sliding sleeve 4 and the anchoring portion 5, and is disengaged from the recessed structure 9*b* for releasing the sliding sleeve 4 and the anchoring portion 5. In another embodiment, the sliding sleeve 4 could have the protrusion 9*a*, and the anchoring portion 5 could have the recessed structure 9*b*. The recessed structure 9*b* could be an arc-shaped groove and the protrusion 9*b* could have a protruding curved surface mating with the arc-shaped groove, but not limited thereto. As such, via engagement between the protruding curved surface and the arc-shaped groove, the present invention can reduce friction between the protrusion 9*a* and the recessed structure 9*b* to prevent abrasion of the sliding sleeve 4 and the anchoring portion 5, so as to increase the service life of the reversible mechanism 30 of the present invention.

The reversible design for the reversible mechanism 100 of the present invention is described as follows with the aforesaid drawings. When the user wants to perform the reversing operation of the handle 10, the user just needs to operate the release actuator 1 to slide relative to the handle 10. During the aforesaid process, the driving member 2 is driven by the linking member 3 to slide relative to the handle 10, so as to disengage the sliding sleeve 4 from the anchoring portion 5. After the sliding sleeve 4 is disengaged from the anchoring portion 5, the handle 10 can be rotatable relative to the stroller frame 20. Subsequently, the user can rotate the handle 10 to a reversing position and then release the release actuator 1. At this time, the elastic member 6 can drive the driving member 2, the release actuator 1, and the sliding sleeve 4 to return to their original positions, so as to make the sliding sleeve 4 engaged with the anchoring portion 5 at the reversing position.

Compared with the prior art, the stroller 100 of the present invention includes the stroller frame 20, the reversible member pivoted to the stroller frame 20, and the reversible mechanism 30. The reversible member can be locked at different positions on the stroller frame 20 via the reversible mechanism 30, so as to achieve the purpose that the handle reversing operation of the stroller 100 can be performed quickly and conveniently. Via the aforesaid design that the sliding sleeve 4 can be engaged with or disengaged from the anchoring portion 5, the release actuator 1 is linked with the sliding sleeve 4, the release actuator 1 and the sliding sleeve 4 are movably disposed on the reversible member, and the anchoring portions 5 are disposed on at least two different positions of the stroller frame 20, the sliding sleeve 4 can be engaged with any one of the anchoring portions 5 for locking the reversible member at the different positions on the stroller frame 20. In such a manner, after the user operates the release actuator 1, movement of the release actuator 1 can drive the sliding sleeve 4 to be disengaged from the anchoring portion 5, so as to make the reversible member rotatable relative to the stroller frame 20. Subsequently, the reversible member can be locked at a reversing position on the stroller frame 20 after rotating the reversible member to the reversing position. In summary, since the release actuator 1 is linked with the sliding sleeve 4, the release actuator 1 can be disposed at a position easy to operate, so as to achieve the purpose that the handle reversing operation of the stroller 100 can be performed conveniently and quickly. Furthermore, as known from the aforesaid description, the reversible mechanism 30 of the present invention has a simple structural design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stroller comprising:
   a stroller frame;
   a reversible member pivoted to the stroller frame; and
   a reversible mechanism locking the reversible member at different positions relative to the stroller frame and comprising:
   anchoring portions disposed on at least two different positions of the stroller frame;
   a sliding sleeve movably jacketing the reversible member, the sliding sleeve being selectively engaged with any one of the anchoring portions for locking the reversible member at the different positions relative to the stroller frame;
   a release actuator protrusively disposed on the reversible member and linked with the sliding sleeve, the sliding sleeve being switched between a locking position and a releasing position with movement of the release actuator or being directly operated for locking or releasing the anchoring portion, the release actuator being slidable along a lengthwise direction of the reversible member, an avoiding hole being formed on the release actuator and having an opening, and the avoiding hole being a long hole for guiding and limiting movement of the release actuator; and a driving member slidably disposed in the reversible member and linked with the sliding sleeve, the sliding sleeve being slidably disposed on the reversible member along the lengthwise direction of the reversible member.

2. The stroller of claim 1, wherein the stroller further comprises a pivot shaft disposed on the reversible member or the stroller frame, and the reversible member is pivotally connected to the stroller frame via the pivot shaft.

3. The stroller of claim 1, wherein the reversible member is a handle.

4. The stroller of claim 1, wherein the reversible mechanism further comprises a linking member disposed in the reversible member, a first end of the linking member is connected to the release actuator, a second end of the linking member is connected to the driving member, a containing cavity is formed on the reversible member, and the driving member and the linking member are slidably disposed in the containing cavity.

5. A reversible mechanism disposed on a stroller, the stroller comprising a stroller frame and a reversible member pivoted to the stroller frame, the reversible mechanism locking the reversible member at different positions relative to the stroller frame and comprising:

anchoring portions disposed on at least two different positions of the stroller frame;

a sliding sleeve movably jacketing the reversible member, the sliding sleeve being selectively engaged with any one of the anchoring portions for locking the reversible member at the different positions relative to the stroller frame;

a release actuator protrusively disposed on the reversible member and linked with the sliding sleeve, the sliding sleeve being switched between a locking position and a releasing position with movement of the release actuator or being directly operated for locking or releasing the anchoring portion, the release actuator being slidable along a lengthwise direction of the reversible member, an avoiding hole being formed on the release actuator and having an opening, and the avoiding hole being a long hole for guiding and limiting movement of the release actuator; and a driving member slidably disposed in the reversible member and linked with the sliding sleeve, the sliding sleeve being slidably disposed on the reversible member along the lengthwise direction of the reversible member.

6. The reversible mechanism of claim 5, wherein the reversible mechanism further comprises a linking member disposed in the reversible member, a first end of the linking member is connected to the release actuator, and a second end of the linking member is connected to the sliding sleeve.

7. The reversible mechanism of claim 6, wherein the second end of the linking member is connected to the driving member; when the release actuator is operated, the release actuator moves the driving member via the linking member for driving the sliding sleeve to lock or release the anchoring portion.

8. The reversible mechanism of claim 7, wherein the reversible mechanism further comprises an elastic member disposed in the reversible member, the elastic member is disposed between the reversible member and the driving member, and the elastic member biases the driving member to keep driving the sliding sleeve to be engaged with the anchoring portion.

9. The reversible mechanism of claim 8, wherein the elastic member is in a compressed state and is disposed between the reversible member and the driving member.

10. The reversible mechanism of claim 8, wherein the linking member is disposed through the elastic member.

11. The reversible mechanism of claim 7, wherein the driving member is fixedly connected to the sliding sleeve.

12. The reversible mechanism of claim 6, wherein the reversible mechanism further comprises a fixing pin, and the fixing pin is fixedly connected to the first end of the linking member and the release actuator.

13. The reversible mechanism of claim 12, wherein a first guide slot is formed along the lengthwise direction of the reversible member, and the fixing pin is slidably disposed through the first guide slot.

14. The reversible mechanism of claim 6, wherein the linking member is a rigid link or a flexible steel wire.

15. The reversible mechanism of claim 5, wherein one of the sliding sleeve and the anchoring portion has a protrusion, the other of the sliding sleeve and the anchoring portion has a recessed structure, the protrusion slides into the recessed structure to lock the sliding sleeve on the anchoring portion, and the protrusion is disengaged from the recessed structure to release the sliding sleeve from the anchoring portion.

16. The reversible mechanism of claim 15, wherein the recessed structure is an arc-shaped groove, and the protrusion has a convex curved surface mating with the arc-shaped groove.

\* \* \* \* \*